(12) United States Patent
Matsumoto

(10) Patent No.: US 9,045,365 B2
(45) Date of Patent: *Jun. 2, 2015

(54) FUSION-BONDING PROCESS FOR GLASS

(75) Inventor: Satoshi Matsumoto, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 444 days.

This patent is subject to a terminal disclaimer.

(21) Appl. No.: 12/994,399

(22) PCT Filed: Jun. 3, 2009

(86) PCT No.: PCT/JP2009/060162
§ 371 (c)(1),
(2), (4) Date: Nov. 23, 2010

(87) PCT Pub. No.: WO2009/157282
PCT Pub. Date: Dec. 30, 2009

(65) Prior Publication Data
US 2011/0088430 A1    Apr. 21, 2011

(30) Foreign Application Priority Data

Jun. 23, 2008  (JP) .................................. 2008-163680

(51) Int. Cl.
*C03C 8/24*    (2006.01)
*C03C 27/10*   (2006.01)
(Continued)

(52) U.S. Cl.
CPC ............... *C03C 27/10* (2013.01); *B23K 26/324* (2013.01); *B23K 2201/18* (2013.01);
(Continued)

(58) Field of Classification Search
CPC ............ C03C 27/06; C03C 8/24; C03C 27/10
USPC ......... 65/36, 43, 45, 146–151, 138, 140, 155; 438/107, 455; 428/34; 156/99
See application file for complete search history.

(56) References Cited

U.S. PATENT DOCUMENTS 3,453,097 A    7/1969  Hafner
3,663,793 A    5/1972  Petro et al.
(Continued)

FOREIGN PATENT DOCUMENTS

CN    1329395    1/2002
CN    1738777    2/2006
(Continued)

OTHER PUBLICATIONS

JP 2008115057 (Human Translation), retrieved from USPTO Translation Services.*
(Continued)

*Primary Examiner* — Richard Crispino
*Assistant Examiner* — Yana B Krinker
(74) *Attorney, Agent, or Firm* — Drinker Biddle & Reath LLP

(57) ABSTRACT

When melting a glass layer 3 by irradiating a region to be fused R therealong with a laser beam L1, the region to be fused R is irradiated therealong with the laser beam L1 having a first heat input, so as to melt the glass layer 3, the heat input is switched when the melting ratio of the glass layer 3 in a direction substantially orthogonal to a moving direction of the laser beam L1 exceeds a predetermined level, and the region to be fused R is irradiated therealong with the laser beam L1 having a second heat input smaller than the first heat input, so as to fix the glass layer 3 to a glass member 4. This inhibits the glass layer 3 from falling into an excessive heat input state and thus deters the glass layer 3 from crystallizing during burning. The glass member 4 is fused to a glass member 5 through the glass layer 3 thus deterred from crystallizing, so as to yield a glass fusing structure 1.

4 Claims, 13 Drawing Sheets

(51) Int. Cl.
  *B23K 26/32* (2014.01)
  *C03B 23/24* (2006.01)
  *C03C 17/04* (2006.01)
  *C03C 23/00* (2006.01)

(52) U.S. Cl.
  CPC ........ *B23K 2203/10* (2013.01); *B23K 2203/18* (2013.01); *C03B 23/245* (2013.01); *C03C 17/04* (2013.01); *C03C 23/0025* (2013.01)

(56) References Cited

U.S. PATENT DOCUMENTS

| | | |
|---|---|---|
| 4,343,833 A | 8/1982 | Sawae et al. |
| 5,489,321 A | 2/1996 | Tracy et al. |
| 6,565,400 B1 | 5/2003 | Lee et al. |
| 7,371,143 B2 | 5/2008 | Becken et al. |
| 7,641,976 B2 | 1/2010 | Lamberson et al. |
| 7,820,941 B2 | 10/2010 | Brown et al. |
| 7,834,550 B2 | 11/2010 | Lee et al. |
| 7,932,670 B2 | 4/2011 | Yoo et al. |
| 8,063,561 B2 | 11/2011 | Choi et al. |
| 8,440,479 B2 | 5/2013 | Nguyen et al. |
| 8,490,434 B2 | 7/2013 | Watanabe et al. |
| 8,516,852 B2 | 8/2013 | Matsumoto et al. |
| 2004/0069017 A1 | 4/2004 | Li et al. |
| 2004/0207314 A1 | 10/2004 | Aitken et al. |
| 2005/0103755 A1 | 5/2005 | Baker et al. |
| 2006/0082298 A1 | 4/2006 | Becken et al. |
| 2007/0007894 A1 | 1/2007 | Aitken et al. |
| 2007/0053088 A1 | 3/2007 | Kranz et al. |
| 2007/0128967 A1 | 6/2007 | Becken et al. |
| 2007/0170845 A1 | 7/2007 | Choi et al. |
| 2007/0173167 A1 | 7/2007 | Choi |
| 2008/0106194 A1 | 5/2008 | Logunov et al. |
| 2008/0124558 A1* | 5/2008 | Boek et al. ................ 428/427 |
| 2008/0135175 A1 | 6/2008 | Higuchi |
| 2008/0182062 A1 | 7/2008 | Becken et al. |
| 2009/0071588 A1 | 3/2009 | Kimura et al. |
| 2009/0080055 A1 | 3/2009 | Baur et al. |
| 2009/0086325 A1 | 4/2009 | Liu et al. |
| 2009/0110882 A1 | 4/2009 | Higuchi |
| 2009/0142984 A1 | 6/2009 | Logunov et al. |
| 2009/0297861 A1 | 12/2009 | Banks et al. |
| 2009/0297862 A1 | 12/2009 | Boek et al. |
| 2009/0308105 A1 | 12/2009 | Pastel et al. |
| 2010/0006228 A1 | 1/2010 | Abe et al. |
| 2010/0095705 A1 | 4/2010 | Burkhalter et al. |
| 2010/0116119 A1 | 5/2010 | Bayne |
| 2010/0129666 A1 | 5/2010 | Logunov et al. |
| 2010/0154476 A1* | 6/2010 | Becken et al. ................ 65/36 |
| 2010/0267307 A1 | 10/2010 | Park et al. |
| 2010/0304513 A1 | 12/2010 | Nguyen et al. |
| 2011/0001424 A1 | 1/2011 | Logunov et al. |
| 2011/0061789 A1 | 3/2011 | Matsumoto |
| 2011/0067448 A1 | 3/2011 | Matsumoto et al. |
| 2011/0072855 A1 | 3/2011 | Matsumoto et al. |
| 2011/0088430 A1 | 4/2011 | Matsumoto |
| 2011/0088431 A1 | 4/2011 | Matsumoto |
| 2011/0135857 A1 | 6/2011 | Logunov et al. |
| 2011/0169108 A1 | 7/2011 | Gardner et al. |
| 2011/0223360 A1 | 9/2011 | Shibuya et al. |
| 2011/0223371 A1 | 9/2011 | Kawanami |
| 2011/0256407 A1 | 10/2011 | Boek et al. |
| 2011/0265518 A1 | 11/2011 | Matsumoto et al. |
| 2012/0111059 A1 | 5/2012 | Watanabe et al. |
| 2012/0147538 A1 | 6/2012 | Kawanami et al. |
| 2012/0151965 A1 | 6/2012 | Matsumoto et al. |
| 2012/0156406 A1 | 6/2012 | Banks et al. |
| 2012/0222450 A1 | 9/2012 | Lamberson et al. |
| 2012/0234048 A1 | 9/2012 | Matsumoto |
| 2012/0240628 A1 | 9/2012 | Matsumoto |
| 2012/0240629 A1 | 9/2012 | Matsumoto |
| 2012/0240630 A1 | 9/2012 | Matsumoto |
| 2012/0240631 A1 | 9/2012 | Matsumoto |
| 2012/0240632 A1 | 9/2012 | Matsumoto |
| 2012/0240633 A1 | 9/2012 | Matsumoto |
| 2012/0247153 A1 | 10/2012 | Matsumoto |
| 2012/0260694 A1 | 10/2012 | Matsumoto |
| 2012/0285200 A1 | 11/2012 | Tanaka |
| 2012/0287026 A1 | 11/2012 | Masuda |
| 2012/0318023 A1 | 12/2012 | Shimomura |
| 2012/0320444 A1 | 12/2012 | Baur et al. |
| 2013/0011598 A1 | 1/2013 | Kawanami et al. |
| 2013/0104980 A1 | 5/2013 | Sridharan et al. |
| 2013/0111953 A1 | 5/2013 | Maloney et al. |
| 2013/0134396 A1 | 5/2013 | Shimomura et al. |
| 2013/0174608 A1 | 7/2013 | Takeuchi et al. |
| 2013/0237115 A1 | 9/2013 | Choi et al. |
| 2013/0280981 A1 | 10/2013 | Lee |
| 2013/0314760 A1 | 11/2013 | Baur et al. |

FOREIGN PATENT DOCUMENTS

| | | | | |
|---|---|---|---|---|
| CN | 1798708 | | 7/2006 | |
| CN | 1798710 | | 7/2006 | |
| CN | 1836177 | | 9/2006 | |
| CN | 101005915 | | 7/2007 | |
| CN | 101095247 | | 12/2007 | |
| CN | 101103429 | | 1/2008 | |
| CN | 101139165 | | 3/2008 | |
| CN | 100409392 C | | 8/2008 | |
| CN | 101312234 | | 11/2008 | |
| CN | 101434453 | | 5/2009 | |
| CN | 101501808 | | 8/2009 | |
| CN | 102056858 | | 5/2011 | |
| JP | 2-120259 | | 5/1990 | |
| JP | 5166462 | | 7/1993 | |
| JP | 2002-015108 | | 1/2002 | |
| JP | 2002-224871 | | 8/2002 | |
| JP | 2002-287107 | | 10/2002 | |
| JP | 2002-366050 | | 12/2002 | |
| JP | 2002-367514 | | 12/2002 | |
| JP | 2002366050 | * | 12/2002 | ................ G09F 9/00 |
| JP | 20022366050 | * | 12/2002 | ................ G09F 9/00 |
| JP | 2004-182567 | | 7/2004 | |
| JP | 2005-007665 | | 1/2005 | |
| JP | 2005-213125 | | 8/2005 | |
| JP | 2006-151774 | | 6/2006 | |
| JP | 2006-524419 | | 10/2006 | |
| JP | 2007-90405 | | 4/2007 | |
| JP | 2007-264135 | | 10/2007 | |
| JP | 2008-115057 | | 5/2008 | |
| JP | 2008-115067 | | 5/2008 | |
| JP | 2008115057 | * | 5/2008 | ................ C03C 8/14 |
| JP | 2008-127223 | | 6/2008 | |
| JP | 2008-527655 | | 7/2008 | |
| JP | 2009-123421 | | 6/2009 | |
| JP | 2009-196862 | | 9/2009 | |
| KR | 10-0350323 | | 3/2002 | |
| KR | 10-2007-0003681 | | 1/2007 | |
| TW | I495409 | | 7/2002 | |
| TW | 200516064 | | 5/2005 | |
| TW | I255934 | | 6/2006 | |
| TW | 200733787 | | 9/2007 | |
| TW | 200737370 | | 10/2007 | |
| TW | 200822789 | | 5/2008 | |
| TW | 200911438 | | 3/2009 | |
| TW | 200944908 | | 11/2009 | |
| WO | WO2007067533 | * | 6/2007 | ............. H01L 21/56 |
| WO | WO 2007067533 A2 | * | 6/2007 | ............. H01L 21/56 |
| WO | WO 2009/131144 | | 10/2009 | |
| WO | WO 2009/150975 | | 12/2009 | |
| WO | WO 2009/150976 | | 12/2009 | |
| WO | WO 2009/157281 | | 12/2009 | |
| WO | WO 2009-157282 | | 12/2009 | |

OTHER PUBLICATIONS

JP20022366050 (Human Translation), retrieved from USPTO Translation Services.*
JP 2002366050 (Human Translation), retrieved from USPTO Translation Services.*
U.S. Office Action dated Jun. 6, 2012 that issued in U.S. Appl. No. 13/345,199 including Double Patenting Rejections on pp. 5-8.

(56) References Cited

OTHER PUBLICATIONS

U.S. Office Action dated Jun. 28, 2012 that issued in U.S. Appl. No. 12/994,320 including Double Patenting Rejections on pp. 7-9.
U.S. Office Action dated Jul. 9, 2012 that issued in U.S. Appl. No. 12/994,321 including Double Patenting Rejections on pp. 7-9.
Cheung, Kerry, "Die-Level Glass Frit Vacuum Packaging for a Micro-Fuel Processor System," Massachusetts Institute of Technology, Jun. 2005, pp. 17-19.
U.S. Office Action dated Jan. 22, 2013 that issued in U.S. Appl. No. 13/345,199 including Double Patenting Rejections on pp. 6-8.
U.S. Office Action dated Apr. 25, 2013 that issued in U.S. Appl. No. 12/994,539 including Double Patenting Rejections on pp. 5-8.
JP 20022366050 (Machine Translation), as attached to Office Action dated Jun. 1, 2012 in U.S. Appl. No. 12/994,354.
JP 2008115057 (Machine Translation), as attached to Office Action dated Jun. 1, 2012 in U.S. Appl. No. 12/994,354.
U.S. Office Action dated Jul. 2, 2014 that issued in U.S. Appl. No. 13/511,754 including Double Patenting Rejections on pp. 5-8.
U.S. Office Action dated Jul. 31, 2014 that issued in U.S. Appl. No. 12/994,354 including Double Patenting Rejections on pp. 7-10.
U.S. Office Action dated Jun. 3, 2014 that issued in U.S. Appl. No. 13/511,683 including Double Patenting Rejections on pp. 5-11.
U.S. Office Action dated Jan. 16, 2014 that issued in U.S. Appl. No. 13/511,735 including Double Patenting Rejections on pp. 4-8.
U.S. Office Action dated Jan. 28, 2014 that issued in U.S. Appl. No. 13/511,688 including Double Patenting Rejections on pp. 4-8.
U.S. Office Action dated Jul. 1, 2014 that issued in U.S. Appl. No. 13/511,738 including Double Patenting Rejections on pp. 4-5.
U.S. Office Action dated May 9, 2013 that issued in U.S. Appl. No. 12/994,399 including Double Patenting Rejections on pp. 6-10.
U.S. Office Action dated Jan. 22, 2014 that issued in U.S. Appl. No. 13/509,112 including Double Patenting Rejections on pp. 4-5.
U.S. Office Action dated Jul. 1, 2014 that issued in U.S. Appl. No. 13/511,747 including Double Patenting Rejections on pp. 4-5.
U.S. Office Action dated Apr. 25, 2014 that issued in U.S. Appl. No. 13/511,721 including Double Patenting Rejections on pp. 2-3.
U.S. Office Action dated Feb. 24, 2015 that issued in U.S. Appl. No. 13/345,199 including Double Patenting Rejections on pp. 4-14.

* cited by examiner

FUSION-BONDING PROCESS FOR GLASS

TECHNICAL FIELD

The present invention relates to a glass fusing method for manufacturing a glass fusing structure by fusing glass members together.

BACKGROUND ART

Known as a conventional glass fusing method in the above-mentioned technical field is one comprising burning a glass layer containing a laser-absorbing pigment onto one glass member along a region to be fused, then overlaying the other glass member on the former glass member such that the glass layer is interposed therebetween, and irradiating the region to be fused therealong with a laser beam, so as to fuse one glass member and the other glass member together.

Meanwhile, a typical technique for burning a glass layer onto a glass member is one removing an organic solvent and a binder from a paste layer containing a glass frit, a laser-absorbing pigment, the organic solvent and the binder, so as to fix the glass layer firmly to the glass member; and then heating the glass member having the glass layer firmly attached thereto in a firing furnace, so as to melt the glass layer, thereby burning the glass layer onto the glass member (see, for example, Patent Literature 1).

On the other hand, proposed from the viewpoint of suppressing the increase in energy consumption and burning time caused by the use of the firing furnace (i.e., the viewpoint of higher efficiency) is a technique which irradiates a glass layer firmly attached to a glass member with a laser beam, so as to melt the glass layer, thereby burning the glass layer onto the glass member (see, for example, Patent Literature 2).

CITATION LIST

Patent Literature

Patent Literature 1: Japanese Translated International Patent Application Laid-Open No. 2006-524419
Patent Literature 2: Japanese Patent Application Laid-Open No. 2002-366050

SUMMARY OF INVENTION

Technical Problem

However, when a glass layer is burned onto a glass member by irradiation with a laser beam, the glass member may incur damages such as cracks occurring therein at the time of burning or fusing of glass members thereafter.

In view of such circumstances, it is an object of the present invention to provide a glass fusing method which can efficiently fuse glass members by preventing the glass members from being damaged.

Solution to Problem

For achieving the above-mentioned object, the inventor conducted diligent studies and, as a result, has found out that the burning of the glass layer by irradiation with a laser beam leads to damages in the glass members because of the fact that the laser absorptance of the glass layer drastically increases when the temperature of the glass layer exceeds its melting point Tm at the time of burning as illustrated in FIG. 12. That is, in the glass layer firmly attached to the glass member, voids formed by the removal of the binder and the graininess of the glass frit produce scattering of light exceeding the absorption characteristic of the laser-absorbing pigment, so that the laser absorptance is low (e.g., the glass layer appears whiter under visible light). When a laser beam is emitted with such a laser power P that the glass layer attains a temperature Tp higher than the melting point Tm but lower than its crystallization temperature Tc as illustrated in FIG. 13, the glass frit melts to fill the voids and loses the particle property, so that the laser-absorbing pigment remarkably exhibits its absorption characteristic, whereby the glass layer drastically increases its laser absorptance (e.g., appears darker under visible light). This causes the glass layer to absorb the laser beam more than expected, thereby generating cracks in the glass member because of a heat shock due to excessive heat input. In practice, as illustrated in FIG. 13, the laser irradiation at the laser power P lets the glass layer reach a temperature Ta higher than the crystallization temperature Tc. In practice, as illustrated in FIG. 13, the laser irradiation at the laser power P lets the glass layer reach a temperature Ta higher than the crystallization temperature Tc. When a portion of the glass layer on the side opposite from the glass member onto which it is to be burned (i.e., a portion of the glass layer located on the side of the glass member to which it is to be fused) is crystallized by excessive heat input, the melting point rises in this portion. This makes it necessary to emit the laser beam with a higher laser power at the time of fusing the glass members together thereafter so as to melt the portion of the glass layer located on the side of the glass member to which it is to be fused, whereby cracks are generated in the glass member because of a heat shock due to excessive heat input as in the burning. The inventor has conducted further studies based on this finding, thereby completing the present invention. The change in color of the glass layer under visible light in the case where the laser absorptance of the glass layer is enhanced by the melting of the glass layer is not limited to the change from a whiter state to a darker state. For example, laser-absorbing pigments for near-infrared laser beams include those exhibiting green when the glass layer melts.

The glass fusing method in accordance with the present invention is a glass fusing method for manufacturing a glass fusing structure by fusing first and second glass members together, the method comprising the steps of disposing a glass layer on the first glass member along a region to be fused, the glass layer being formed by removing an organic solvent and a binder from a paste layer containing a glass powder, a laser-absorbing material, the organic solvent and the binder; irradiating the region to be fused therealong with a first laser beam having a first heat input, so as to melt the glass layer, switching the first heat input to a second heat input smaller than the first heat input when the melting ratio of the glass layer in a direction intersecting a moving direction of the first laser beam exceeds a predetermined level, and irradiating the region to be fused therealong with the first laser beam having the second heat input, so as to melt the glass layer, thereby fixing the glass layer to the first glass member; and overlaying the second glass member on the first glass member having the glass layer fixed thereto such that the glass layer is interposed therebetween, and irradiating the region to be fused therealong with a second laser beam, so as to fuse the first and second glass members together.

In this glass fusing method, when irradiating the region to be fused therealong with the first laser beam so as to melt the glass layer, the region to be fused is irradiated therealong with the first laser beam having the first heat input, so as to melt the glass layer, the heat input is switched when the melting ratio of the glass layer in a direction intersecting the moving direction of the first laser beam exceeds a predetermined level, and the region to be fused is irradiated therealong with the first laser beam having the second heat input smaller than the first heat input, so as to melt the glass layer, thereby the glass layer is fixed to the first glass member. Though the laser absorption of the glass layer drastically rises when the melting ratio of the glass layer exceeds a predetermined level at the time of fixing the glass layer, the first laser beam having the second heat input smaller than the first heat input is emitted thereafter, whereby the glass layer is deterred from falling into an excessive heat input state. Even when the glass layer is fixed to the first glass member by irradiation with the first laser beam, such switching of heat input can prevent glass members from incurring damages such as cracks occurring therein at the time of fixing the glass layer and fusing the glass members together thereafter. Therefore, this glass fusing method can efficiently fuse the glass members together by preventing the glass members from being damaged. Here, the "heat input" is the energy density of the first laser beam in its irradiation region. The "melting ratio of the glass layer" is the ratio of the width of the melted part of the glass layer to the whole width of the glass layer in a direction intersecting the moving direction of the first laser beam.

Preferably, in the glass fusing method in accordance with the present invention, the first heat input is switched to the second heat input by lowering the irradiation power of the first laser beam. In this case, since the heat input is changed by lowering the irradiation power, the first heat input can reliably be switched to the second heat input.

Preferably, in the glass fusing method in accordance with the present invention, the first heat input is switched to the second heat input by raising the moving speed of the first laser beam with respect to the glass layer. In this case, since the heat input is changed by raising the moving speed of the first laser beam with respect to the glass layer, the first heat input can reliably be switched to the second heat input. Also, since the switching is effected by raising the moving speed, the time required for fixing the glass layer can be shortened. Here, the "moving speed of the first laser beam with respect to the glass layer" means the relative moving speed of the first laser beam and encompasses each of the cases where the glass layer moves while the first laser beam is stationary, the first laser beam moves while the glass layer is stationary, and both of the laser beam and the glass layer move.

Preferably, in the glass fusing method in accordance with the present invention, the first heat input is switched to the second heat input when a predetermined time lapses from starting irradiation with the first laser beam. In this case, the first heat input can easily be switched to the second heat input by a simple method of controlling the predetermined time defined beforehand and the like. Since substantially the same predetermined time can be used for glass layers having the same structure as long as they are irradiated with the first laser beam under the same condition, a plurality of glass layers having the same structure can easily be melted continuously or simultaneously, which can improve the manufacturing efficiency.

Preferably, in the glass fusing method in accordance with the present invention, the first heat input is switched to the second heat input when the intensity of thermal radiation light radiating from the glass layer rises to a predetermined level. In this case, the heat input can accurately be switched upon detecting the intensity of the thermal radiation light that is related to the melting ratio of the glass layer such as to increase gradually as the latter rises.

Preferably, in the glass fusing method in accordance with the present invention, the first heat input is switched to the second heat input when the intensity of reflected light of the first laser beam reflected by the glass layer decreases to a predetermined level. In this case, the heat input can accurately be switched upon detecting the intensity of the reflected light that is related to the melting ratio of the glass layer such as to decrease gradually as the latter rises.

Advantageous Effects of Invention

The present invention can efficiently fuse glass members together by preventing the glass members from being damaged.

DESCRIPTION OF EMBODIMENTS

Figure 1:
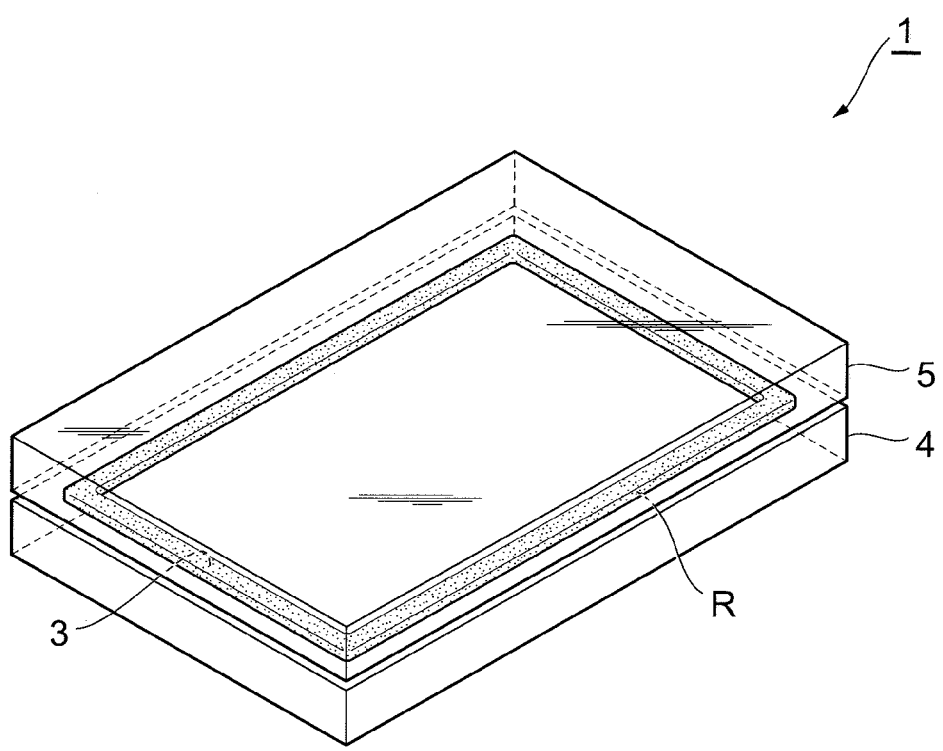
FIG. 1 is a perspective view of a glass fusing structure manufactured by an embodiment of the glass fusing method in accordance with the present invention.

In the following, preferred embodiments of the present invention will be explained in detail with reference to the drawings. In the drawings, the same or equivalent parts will be referred to with the same signs while omitting their overlapping descriptions.

FIG. 1 is a perspective view of the glass fusing structure manufactured by an embodiment of the glass fusing method in accordance with the present invention. As illustrated in FIG. 1, the glass fusing structure 1 is a fusion-bonded glass structure in which glass members (first and second glass members) 4, 5 are fused together through a glass layer 3 formed along a region to be fused R. For example, each of the glass members 4, 5 is a rectangular plate-shaped member made of alkali-free glass having a thickness of 0.7 mm, while the region to be fused R is set like a rectangular ring along the outer edges of the glass members 4, 5. For example, the glass layer 3 is made of low-melting glass (vanadium-phosphatebased glass, lead borosilicate glass, or the like) and formed into a rectangular ring along the region to be fused R.

The glass fusing method for manufacturing the above-mentioned glass fusing structure 1 will now be explained.

Figure 2:
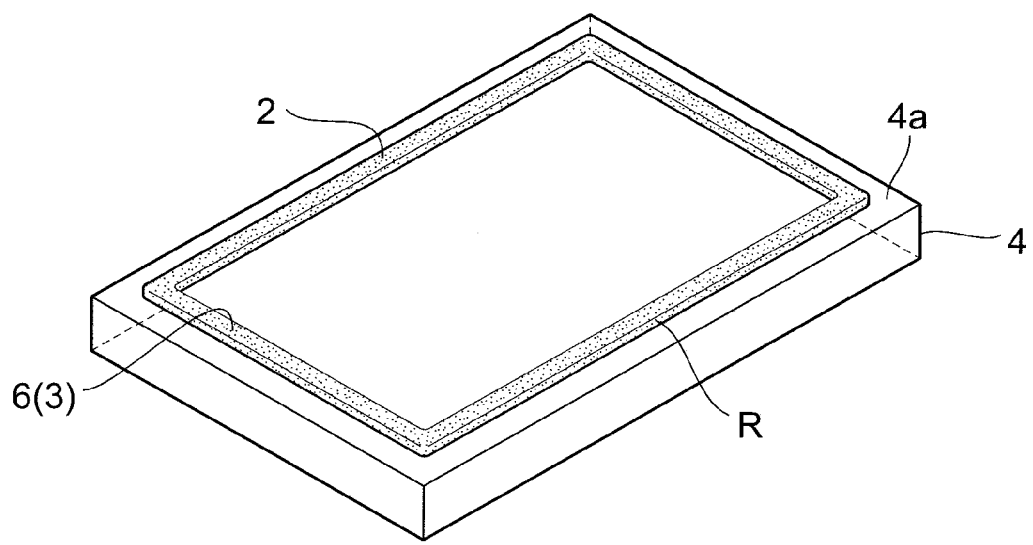
FIG. 2 is a perspective view for explaining the glass fusing method for manufacturing the glass fusing structure of FIG. 1.

First, as illustrated in FIG. 2, a frit paste is applied by a dispenser, screen printing, or the like, so as to form a paste layer 6 on a surface 4a of the glass member 4 along the region to be fused R. An example of the frit paste is one formed by kneading a powdery glass frit (glass powder) 2 made of amorphous low-melting glass (vanadium-phosphate-based glass, lead borosilicate glass, or the like), a laser-absorbing pigment (laser-absorbing material) which is an inorganic pigment such as iron oxide, an organic solvent such as amyl acetate, and a binder which is a resin component (such as acrylic resin) thermally decomposable at the glass softening temperature or lower. The frit paste may also be one in which a glass frit (glass powder) made of powdered low-melting glass doped beforehand with a laser-absorbing pigment (laser-absorbing material), an organic solvent, and a binder are kneaded together. That is, the paste layer 6 contains the glass frit 2, laser-absorbing pigment, organic solvent and, binder.

Subsequently, the paste layer 6 is dried, so as to eliminate the organic solvent, and further heated, so as to remove the binder, thereby firmly attaching the glass layer 3 onto the surface 4a of the glass member 4 along the region to be fused R. Here, voids formed by the removal of the binder and the graininess of the glass frit 2 produce scattering of light exceeding the absorption characteristic of the laser-absorbing pigment, so that the glass layer 3 firmly attached to the surface 4a of the glass member 4 is in a low laser absorptance state (e.g., appears whiter under visible light).

Figure 3:
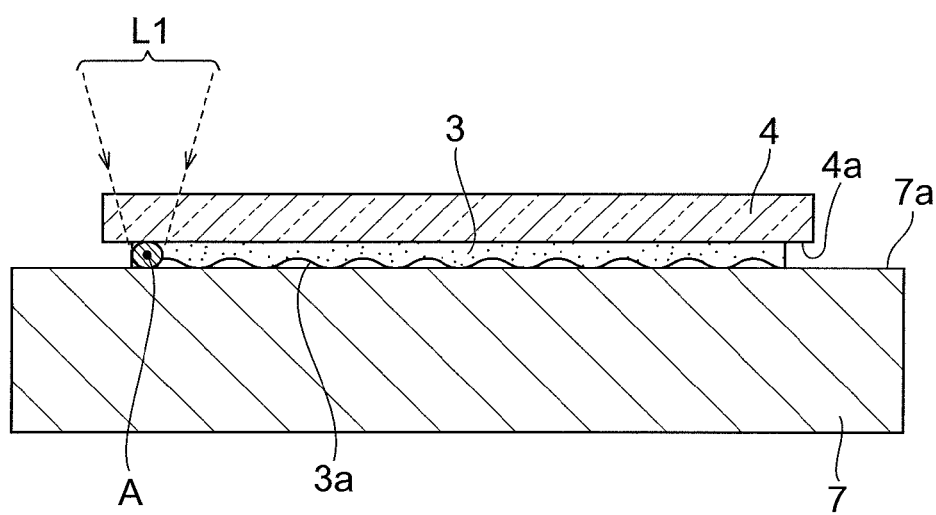
FIG. 3 is a sectional view for explaining the glass fusing method for manufacturing the glass fusing structure of FIG. 1.

Next, as illustrated in FIG. 3, the glass member 4 is mounted on a surface 7a (a polished surface here) of a planar mount table 7 made of aluminum, such that the glass layer 3 is interposed therebetween. As a consequence, the glass layer 3 formed by removing the organic solvent and binder from the paste layer 6 is disposed along the region to be fused R between the glass member 4 and the mount table 7.

Figure 4:
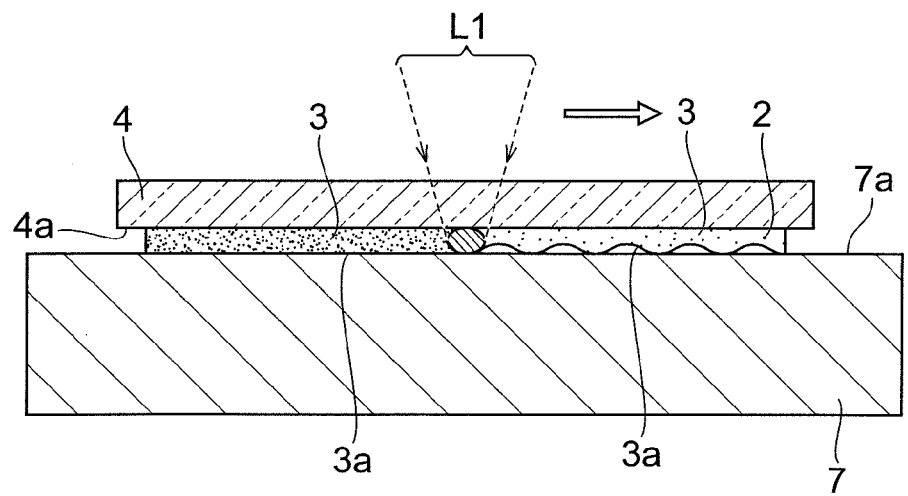
FIG. 4 is a sectional view for explaining the glass fusing method for manufacturing the glass fusing structure of FIG. 1.
Figure 5:
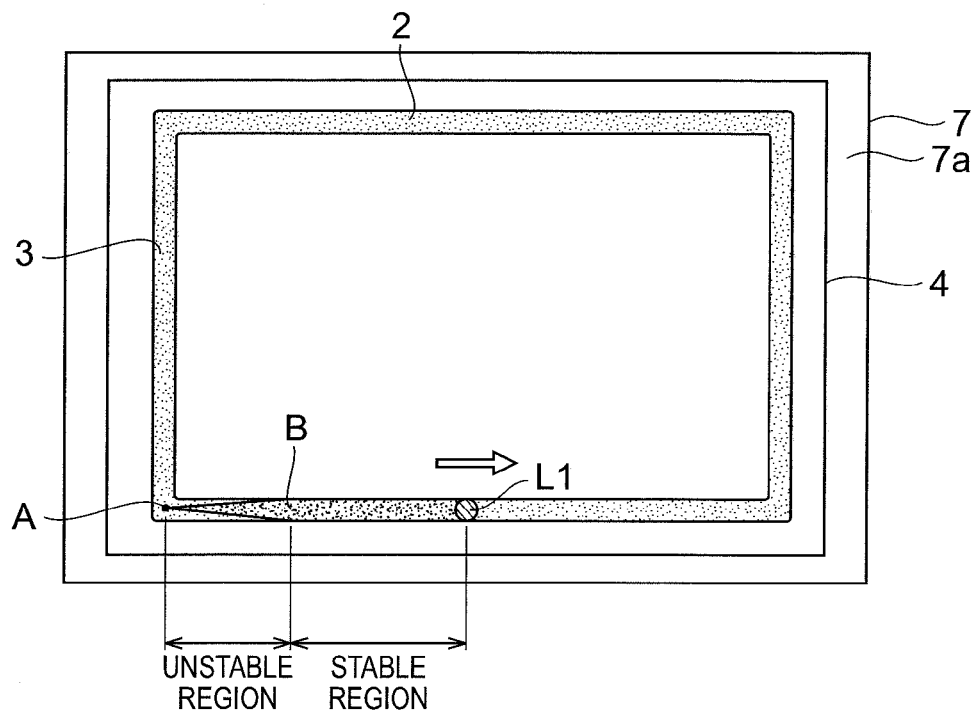
FIG. 5 is a plan view for explaining the glass fusing method for manufacturing the glass fusing structure of FIG. 1.
Figure 6:
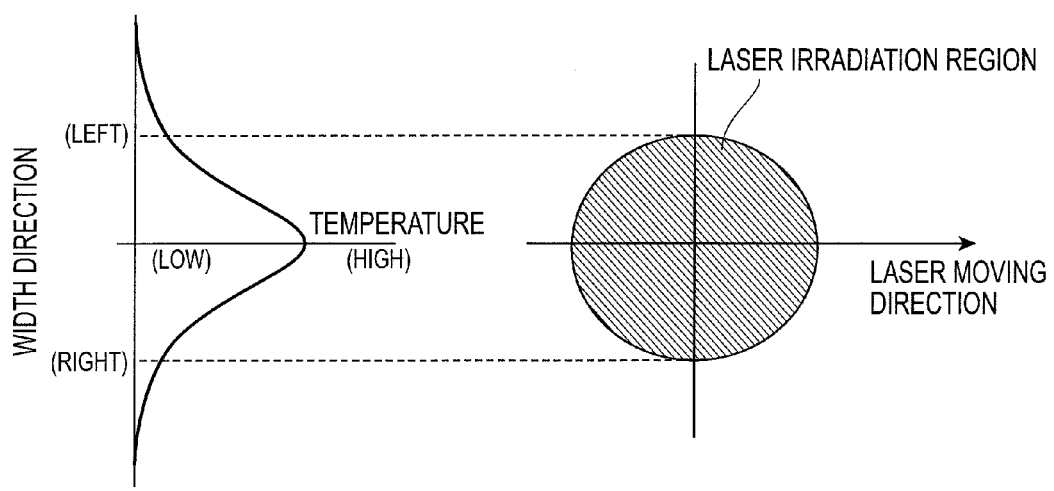
FIG. 6 is a chart illustrating a temperature distribution in laser irradiation.

Subsequently, as illustrated in FIGS. 3 to 5, irradiation with a laser beam (first laser beam) L1 begins while locating a converging spot at an irradiation initiation position A in the region to be fused R in the glass layer 3 and then moves in the direction of the depicted arrow. Meanwhile, as illustrated in FIG. 6, the laser beam L1 has such a temperature distribution that the temperature is higher in the center part in the width direction (direction substantially orthogonal to the moving direction of the laser beam L1) and decreases toward both end parts. Therefore, as illustrated in FIG. 5, it takes a predetermined distance for the melting ratio (the ratio of the width of the melted part in the glass layer 3 to the whole width of the glass layer 3 in a direction substantially orthogonal to the moving direction of the laser beam L1) to rise gradually from the irradiation initiation position A where the melting ratio of the glass layer 3 is substantially zero to a stable region initiation position B where a stable region with the melting ratio of near 100% begins, whereby an unstable region where the glass layer 3 is melted in a part of the width direction exists between the irradiation initiation position A and the stable region initiation position B.

Figure 7:
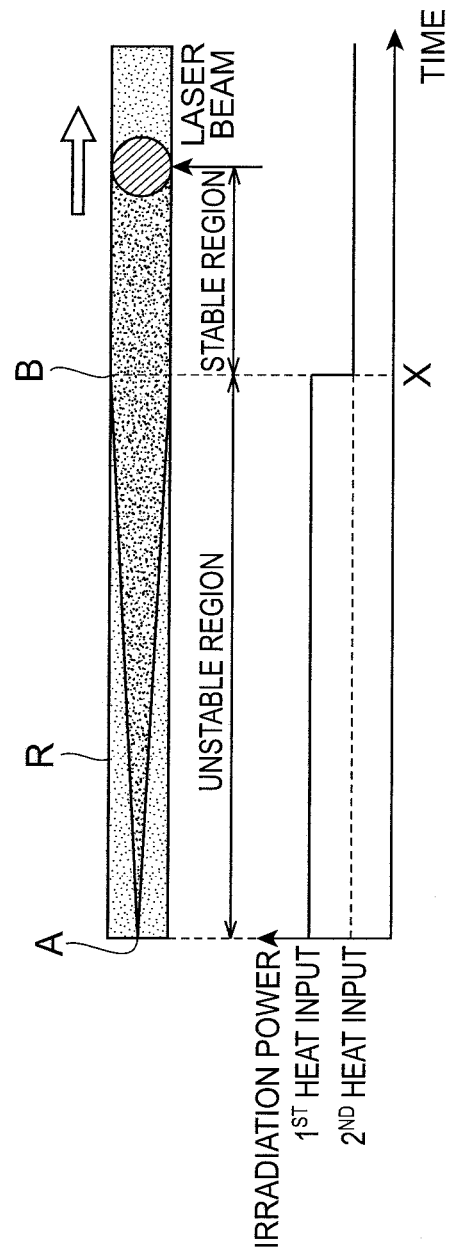
FIG. 7 is a diagram illustrating a switching timing for laser irradiation conditions.

In the unstable region, the melting of the glass layer 3 does not extend over the whole width, so that the laser absorptance is not completely high. Therefore, as illustrated in FIG. 7, the irradiation with the laser beam L1 is started under such a strong irradiation condition that the glass layer 3 in the stable region is crystallized thereby, e.g., a first heat input in which the irradiation power of the laser beam L1 is 10 W. Here, the heat input can be represented by the following expression (1) and is changeable depending on the irradiation power since the moving speed and the spot diameter are constant in this embodiment.

$$\text{Heat input }(J/mm^2) = \text{power density }(J \cdot S/mm^2)/\text{moving speed }(S). \tag{1}$$

Thereafter, when the stable region where the glass layer 3 is melted throughout the width is formed at the stable region initiation position B, the temperature of the glass layer 3 is at the melting point Tm or higher throughout the width, so that the glass fit melts to fill voids, while causing the glass layer 3 to lose the graininess, thus allowing the laser-absorbing pigment to exhibit its absorption characteristic remarkably, thereby drastically raising the laser absorptance of the glass layer 3 throughout the width and yielding the melting ratio of near 100% (e.g., appearing darker under visible light). This makes the glass layer 3 absorb the laser beam L1 more than expected, thereby inputting heat to the glass layer 3 in excess.

Therefore, as illustrated in FIG. 7, the irradiation power of the laser beam L1 is lowered from 10 W to 8 W after a lapse of a predetermined time X by which the glass layer 3 attains the melting ratio of near 100% (or immediately therebefore), i.e., immediately after the glass layer 3 exceeds the melting point Tm throughout the width and drastically raises the laser absorptance, so as to switch the heat input from a first heat input at the irradiation power of 10 W to a second heat input at the irradiation power of 8 W. In this embodiment, the predetermined time is defined beforehand for each structure of the glass layer 3, so that the first heat input is switched to the second heat input by a simple method of controlling the predetermined time X defined beforehand. Since glass layers having the same structure exhibit substantially the same extent of melting in response to the same heat input, substantially the same predetermined time X can be used for them as long as the irradiation condition of the laser beam L1 is the same.

Thereafter, the irradiation of the glass layer 3 with the laser beam L1 is carried out with the irradiation power of 8 W, which is the second heat input, and continued along the region to be fused R until returning to the irradiation initiation position A, so as to complete burning. The laser irradiation may be performed in an overlapping manner such that the unstable region is irradiated with the laser beam L1 again so as to become a stable region as necessary.

Burning the glass layer 3 while performing such control as to switch the heat input melts and resolidifies the glass layer 3 disposed between the glass member 4 and the mount table 7 while inhibiting it from crystallizing. Since the burning is effected by irradiation with the laser beam L1 from the glass member 4 side in this embodiment, the glass layer 3 is reliably fixed to the glass member 4, while the surface 3a of the glass layer 3, which becomes a fusing surface when fusing the glass members 4, 5 together, is further deterred from crystallizing. The glass layer 3 burned onto the surface 4a of the glass member 4 loses the graininess as the glass frit 2 melts to fill voids, so as to allow the laser-absorbing pigment to exhibit its absorption characteristic remarkably, thereby attaining a high laser absorptance state (e.g., appearing darker under visible light).

When the burning of the glass layer 3 inhibited from crystallizing throughout the region to be fused is completed, the glass member 4 having the glass layer 3 burned thereonto is removed from the mount table 7. Here, the difference between the coefficients of linear expansion of the glass frit 2 and thermal conductor 7 is greater than the difference between the coefficients of linear expansion of the glass frit 2 and glass member 4, whereby the glass layer 3 does not firmly attach to the surface 7a of the mount table 7. Since the surface 7a of the mount table 7 is polished, the glass layer 3 burned onto the surface 4a of the glass member 4 is in a state where irregularities on the surface 3a on the side opposite from the glass member 4 are made flat.

Figure 8:
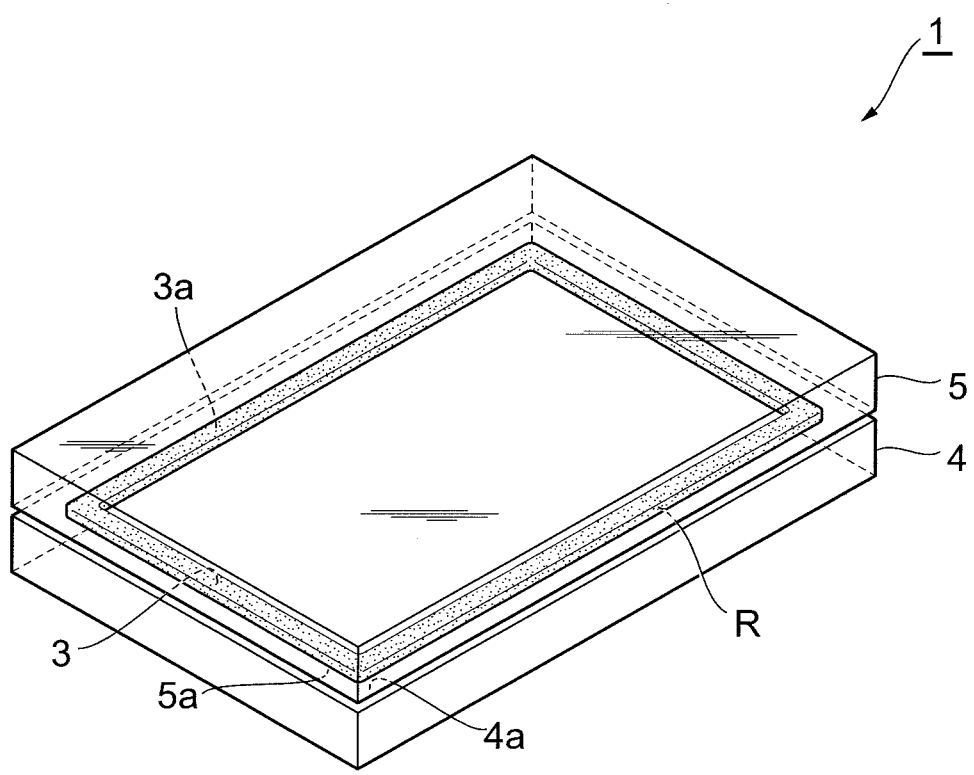
FIG. 8 is a perspective view for explaining a glass fusing method for manufacturing the glass fusing structure of FIG. 1.

Subsequent to the burning of the glass layer 3, as illustrated in FIG. 8, the glass member 5 is overlaid on the glass member 4 having the glass layer 3 burned thereonto, such that the glass layer 3 is interposed therebetween. Here, since the surface 3a of the glass layer 3 is made flat, a surface 5a of the glass member 5 comes into contact with the surface 3a of the glass layer 3 without gaps.

Figure 9:
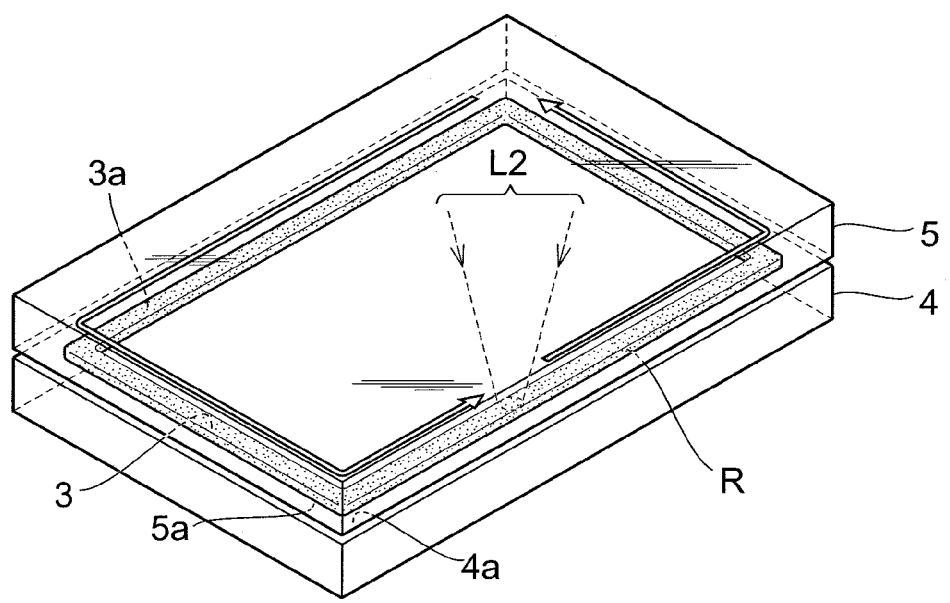
FIG. 9 is a perspective view for explaining a glass fusing method for manufacturing the glass fusing structure of FIG. 1.

Then, as illustrated in FIG. 9, the region to be fused R is irradiated therealong with a laser beam (second laser beam) L2 while locating a converging spot at the glass layer 3. As a consequence, the glass layer 3 having a high laser absorptance while being inhibited from crystallizing throughout the region to be fused R absorbs the laser beam L2, which melts and resolidifies the glass layer 3 and its peripheral portions (the portions of the glass members 4, 5 on the surfaces 4a, 5a), thereby bonding the glass members 4, 5 together. Here, the surface 5a of the glass member 5 comes into contact with the surface 3a of the glass layer 3 without gaps, while the glass layer 3 burned onto the glass member 4 is formed as a stable region where the crystallization upon melting is suppressed throughout the region to be fused R, whereby the glass members 4, 5 are uniformly fused along the region to be fused R without raising the melting point of the glass layer 3 and thus are prevented from being damaged.

As explained in the foregoing, when melting the glass layer 3 by irradiating the region to be fused R therealong with the laser beam L1, the glass fusing method for manufacturing the glass fusing structure 1 irradiates the region to be fused R therealong with the laser beam L1 having the first heat input, so as to melt the glass layer 3, switches the heat input when the melting ratio of the glass layer 3 in a direction substantially orthogonal to the moving direction of the laser beam L1 becomes near 100%, and irradiates the region to be fused R therealong with the first laser beam having the second heat input smaller than the first heat input, so as to melt the glass layer 3 and fix the glass layer 3 to the first glass member 4. Though the laser absorptance of the glass layer 3 rises drastically when the melting ratio of the glass layer 3 reaches near 100% at the time of fixing the glass layer 3, the laser light L1 having the second heat input smaller than the first heat input is emitted thereafter, whereby the glass layer 3 is inhibited from falling into an excessive heat input state. Even when the glass layer 3 is fixed to the glass member 4 by irradiation with the laser beam L1, such switching of heat input can prevent the glass members 4, 5 from incurring damages such as cracks occurring therein at the time of fixing the glass layer 3 and fusing the glass members 4, 5 together thereafter. Therefore, this glass fusing method can efficiently fuse the glass members 4, 5 together by preventing the glass members 4, 5 from being damaged.

The above-mentioned glass fusing method switches the first heat input to the second heat input by lowering the irradiation power of the laser beam L1. Since the heat input is thus switched by lowering the irradiation power, the first heat input can reliably be switched to the second heat input.

In the above-mentioned glass fusing method, the melting ratio becomes near 100% after the lapse of the predetermined time X from starting irradiation with the laser beam L1, and then the first heat input is switched to the second heat input. Therefore, the first heat input can easily be switched to the second heat input by a simple method of controlling the predetermined time X defined beforehand and required for the melting ratio to become near 100%. Since substantially the same predetermined time X can be used for glass layers having the same structure as long as they are irradiated with the laser beam L1 under the same condition, glass layers 3 having the same structure can easily be melted continuously or simultaneously, which can improve the manufacturing efficiency during making a plurality of glass fusing structures 1.

Meanwhile, organic EL packages and the like have a small size themselves, for which thinner glass members 4, 5 are used, so that low expansion glass is often chosen as a material for the glass members 4, 5 in order to make them harder to break. Here, in order for the glass layer 3 to have a coefficient of linear expansion matching that of the glass members 4, 5 (i.e., in order to lower the coefficient of linear expansion of the glass layer 3), the glass layer 3 is made to contain a large amount of a filler constituted by ceramics or the like. By containing the large amount of the filler, the glass layer 3 changes its laser absorptance greatly between before and after irradiation with the laser beam L1. Therefore, the above-mentioned glass fusing method is effective in particular when low expansion glass is chosen as the material for the glass members 4, 5.

The present invention is not limited to the above-mentioned embodiment.

Figure 10:
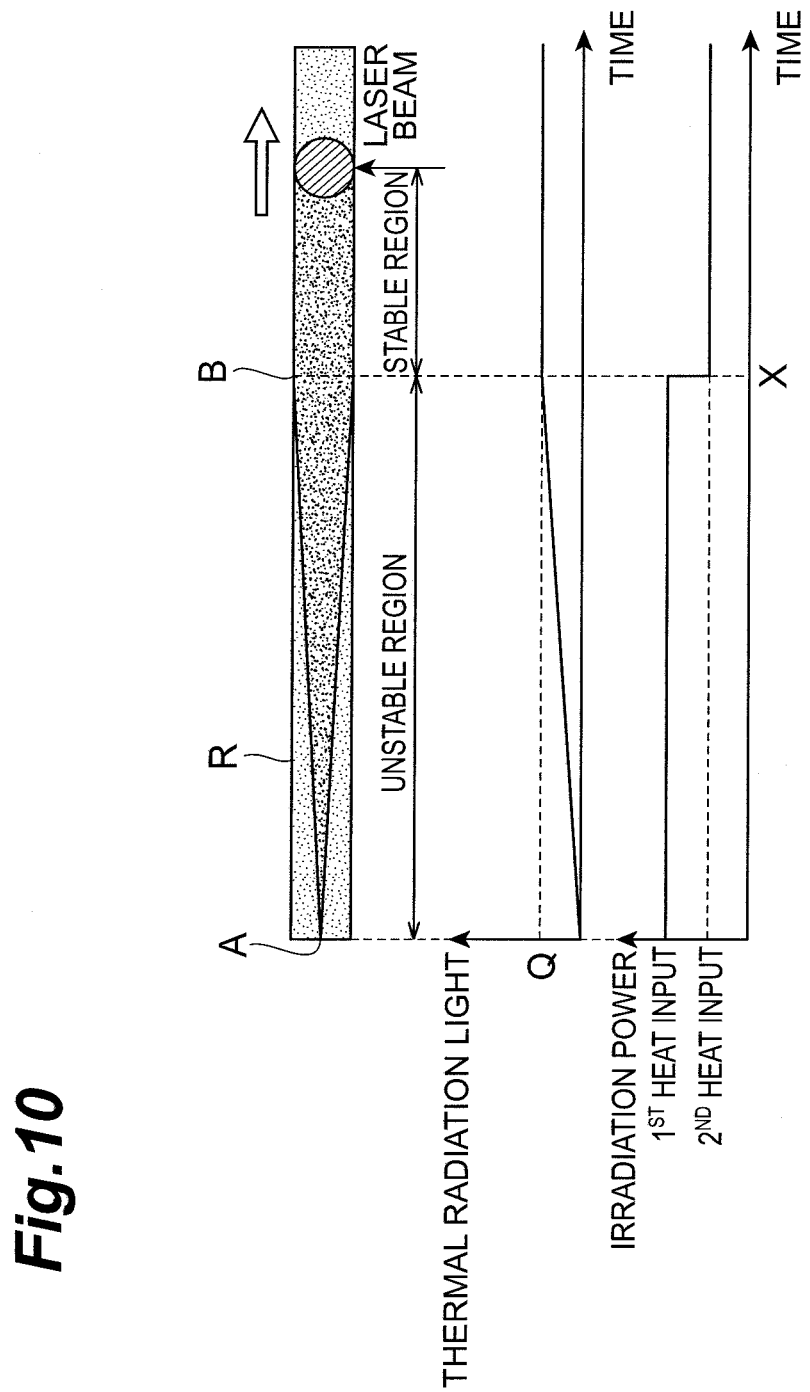
FIG. 10 is a diagram illustrating another switching timing for laser irradiation conditions.
Figure 11:
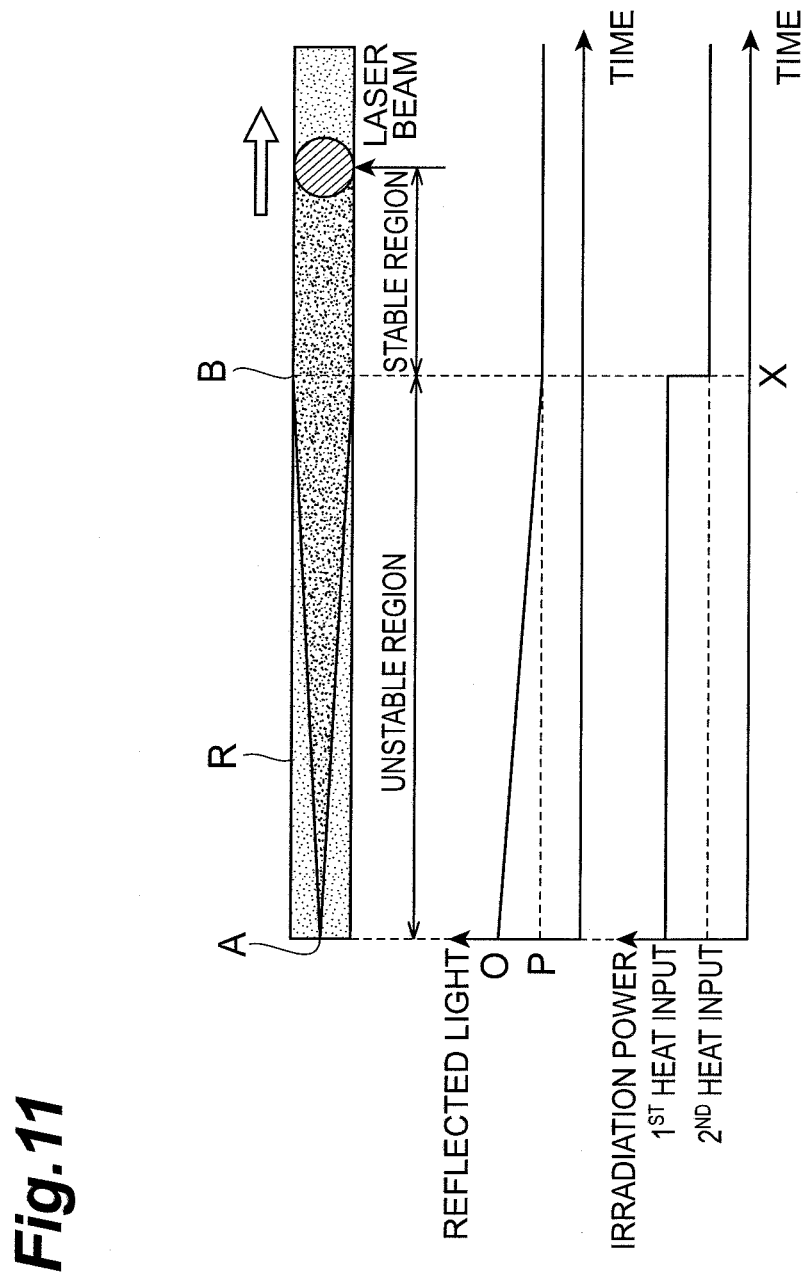
FIG. 11 is a diagram illustrating still another switching timing for laser irradiation conditions.
Figure 12:
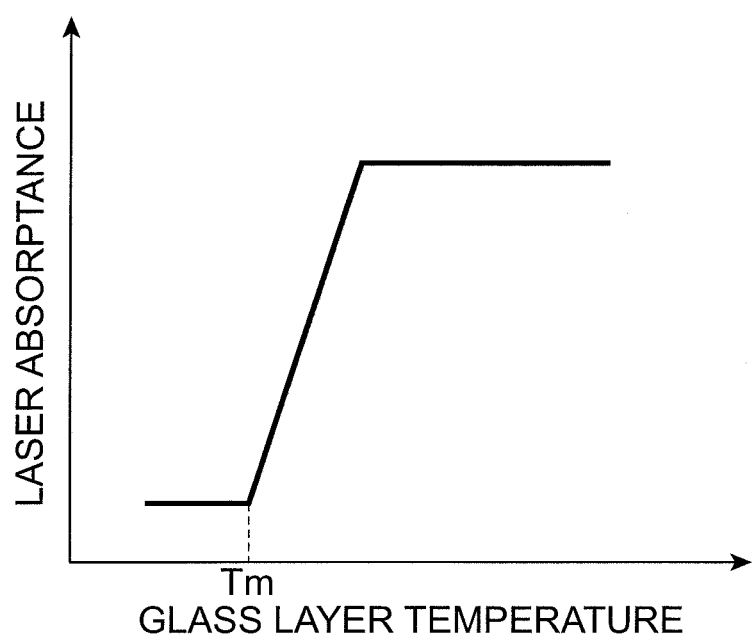
FIG. 12 is a graph illustrating the relationship between the temperature and laser absorptance of a glass layer.
Figure 13:
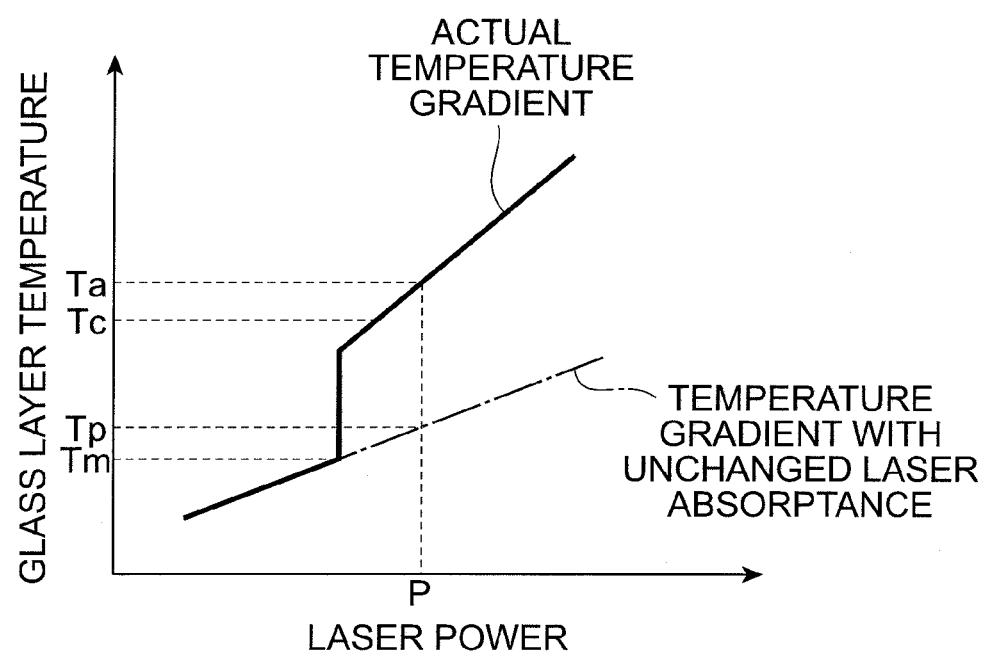
FIG. 13 is a graph illustrating the relationship between the laser power and the temperature of the glass layer.

For example, though the above-mentioned embodiment switches from the first heat input to the second heat input when the melting ratio becomes near 100% after the lapse of the predetermined time X from the irradiation initiation position A for the laser beam L1, the first heat input may be switched to the second heat input when the intensity of thermal radiation light radiating from the glass layer 3 rises to a predetermined level Q as illustrated in FIG. 10. In this case, the heat input can accurately be switched upon detecting the intensity of the thermal radiation light that is related to the melting ratio of the glass layer such as to increase gradually as the latter rises. The first heat input may be switched to the second heat input when the intensity of reflected light of the laser beam L1 reflected by the glass layer 3 decreases to a predetermined level P as illustrated in FIG. 11. In this case, the heat input can accurately be switched upon detecting the intensity of the reflected light that is related to the melting ratio of the glass layer such as to decrease gradually as the latter rises.

Though the above-mentioned embodiment controls the heat input to the glass layer 3 by changing the irradiation power of the laser beam L1, the relative irradiation speed of the laser beam L1 (i.e., the moving speed of the laser beam L1 with respect to the glass layer 3) may be raised while keeping the irradiation power of the laser beam L1 constant as illustrated in the above-mentioned expression (1), so as to switch the heat input to the glass layer 3. In this case, since the heat input is changed by raising the moving speed of the laser beam L1, the first heat input can reliably be switched to the second heat input. Also, since the switching is effected by raising the moving speed, the time required for fixing the glass layer 3 can be shortened. Here, since switching the heat input by raising the moving speed often includes a speed acceleration step, it will be preferred from the viewpoint of inhibiting the glass layer 3 from crystallizing if the switching control for the moving speed is started before the timing for switching arrives (the lapse of the predetermined time X or the intensity of heat radiation light or reflected light becomes a predetermined level) and has completed at the timing for actual switching.

Though the above-mentioned embodiment moves the laser beams L1, L2 with respect to the secured glass members 4, 5, it is sufficient for the laser beams L1, L2 to move relative to the glass members 4, 5. The glass members 4, 5 may be moved while securing the laser beams L1, L2, or each of the glass members 4, 5 and the laser beams L1, L2 may be moved.

Though the above-mentioned embodiment switches the heat input at a predetermined level of the melting ratio such as 100%, the heat input may be switched at a predetermined level of the melting ratio such as 90%, for example, if the glass layer is melted appropriately, so as to reliably inhibit the glass layer 3 from crystallizing.

Though the above-mentioned embodiment irradiates the glass layer 3 with the laser beam L1 through the glass member 4, the glass layer 3 may directly be irradiated with the laser beam L1.

INDUSTRIAL APPLICABILITY

The present invention can efficiently fuse glass members together by preventing the glass members from being damaged.

REFERENCE SIGNS LIST

1 . . . glass fusing structure; 2 . . . glass frit (glass powder); 3 . . . glass layer; 4 . . . glass member (first glass member); 5 . . . glass member (second glass member); 6 . . . paste layer; 7 . . . mount table; A . . . irradiation initiation position; B . . . stable region initiation position; R . . . region to be fused; L1 . . . laser beam (first laser beam); L2 . . . laser beam (second laser beam)

The invention claimed is:

1. A glass fusing method for manufacturing a glass fusing structure by fusing first and second glass members together, the method comprising the steps of:

disposing a glass layer on the first glass member along a region to be fused, the glass layer being formed by removing an organic solvent and a binder from a paste layer containing a glass powder, a laser-absorbing material, the organic solvent and the binder;

irradiating the region to be fused therealong with a first laser beam having a first heat input, so as to melt the glass layer, switching the first heat input to a second heat input smaller than the first heat input when the melting ratio of the glass layer in a direction intersecting a moving direction of the first laser beam exceeds a predetermined level, and irradiating the region to be fused therealong with the first laser beam having the second heat input, so as to melt the glass layer, thereby fixing the glass layer to the first glass member; and overlaying the second glass member on the first glass member having the glass layer fixed thereto such that the glass layer is interposed therebetween, and irradiating the region to be fused therealong with a second laser beam, so as to fuse the first and second glass members together, wherein the melting ratio of the glass layer is the melting ratio at a portion in the glass layer being irradiated with the first laser beam, wherein irradiation with the first laser beam having the first heat input is not performed after the glass layer has melted across a whole width thereof by irradiation with the first laser beam having the first heat input.

2. A glass fusing method according to claim 1, wherein the first heat input is switched to the second heat input by lowering the irradiation power of the first laser beam.

3. A glass layer fixing method for fixing a glass layer to a first glass member along a region to be fused in which the first glass member and a second glass member are adapted to be fused together, the method comprising the steps of:

disposing the glass layer on the first glass member along the region to be fused, the glass layer being formed by removing an organic solvent and a binder from a paste layer containing a glass powder, a laser-absorbing material, the organic solvent and the binder; and irradiating the region to be fused therealong with a first laser beam having a first heat input, so as to melt the glass layer, switching the first heat input to a second heat input smaller than the first heat input when the melting ratio of the glass layer in a direction intersecting a moving direction of the first laser beam exceeds a predetermined level, and irradiating the region to be fused therealong with the first laser beam having the second heat input, so as to melt the glass layer, thereby fixing the glass layer to the first glass member, wherein the melting ratio of the glass layer is the melting ratio at a portion in the glass layer being irradiated with the first laser beam, wherein irradiation with the first laser beam having the first heat input is not performed after the glass layer has melted across a whole width thereof by irradiation with the first laser beam having the first heat input.

4. A glass layer fixing method according to claim 3, wherein the first heat input is switched to the second heat input by lowering the irradiation power of the first laser beam.

* * * * *